United States Patent
Ochiai

(10) Patent No.: US 9,389,996 B2
(45) Date of Patent: Jul. 12, 2016

(54) FIELD APPARATUS

(75) Inventor: Satoru Ochiai, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 152 days.

(21) Appl. No.: 14/241,011

(22) PCT Filed: Aug. 20, 2012

(86) PCT No.: PCT/JP2012/070989
§ 371 (c)(1),
(2), (4) Date: Feb. 25, 2014

(87) PCT Pub. No.: WO2013/031569
PCT Pub. Date: Mar. 7, 2013

(65) Prior Publication Data
US 2014/0215167 A1 Jul. 31, 2014

(30) Foreign Application Priority Data

Sep. 2, 2011 (JP) ................................ 2011-191564

(51) Int. Cl.
| | | |
|---|---|---|
| G06F 3/00 | (2006.01) | |
| G06F 12/02 | (2006.01) | |
| G05B 19/042 | (2006.01) | |
| G05B 23/02 | (2006.01) | |

(52) U.S. Cl.
CPC .............. *G06F 12/02* (2013.01); *G05B 19/042* (2013.01); *G05B 19/0426* (2013.01); *G05B 23/0264* (2013.01); *G05B 2219/14055* (2013.01); *G05B 2219/25428* (2013.01); *G06F 2212/251* (2013.01)

(58) Field of Classification Search
None
See application file for complete search history.

(56) References Cited

U.S. PATENT DOCUMENTS

| | | | | |
|---|---|---|---|---|
| 7,580,992 B2 * | 8/2009 | Eisenbeis | ........... | G05B 19/0426 700/117 |
| 8,570,922 B2 * | 10/2013 | Pratt, Jr. | .................. | H04L 12/66 370/310 |
| 2005/0075817 A1 * | 4/2005 | Kah | ..................... | F16K 31/1262 702/108 |
| 2008/0079596 A1 * | 4/2008 | Baier | ................. | G05B 23/0235 340/679 |

FOREIGN PATENT DOCUMENTS

| | | |
|---|---|---|
| JP | 05-158754 A | 6/1993 |
| WO | 01/14968 A1 | 3/2001 |

OTHER PUBLICATIONS

International Society of Automation (ISA) 100.11a-2009, an ISA Standard, "Wireless systems for industrial automation: Process control and related applications," pp. 1-817.

(Continued)

*Primary Examiner* — Idriss N Alrobaye
*Assistant Examiner* — Richard B Franklin
(74) *Attorney, Agent, or Firm* — Sughrue Mion, PLLC

(57) ABSTRACT

A field apparatus includes a first memory that stores a program specifying an operation of the field apparatus; a second memory that stores parameters to be used in the field apparatus; a log generation unit configured to generate an operating log in which first information representing a type of an event generated within the field apparatus, second information representing a time at which the event was generated, and third information related to the event are associated; and a control unit that includes the log generation unit, the control unit storing the operating log in a log storage region secured in a free space in one of the first memory and the second memory.

12 Claims, 5 Drawing Sheets

(56) References Cited

OTHER PUBLICATIONS

International Search Report of PCT/JP2012/070989 dated Oct. 16, 2012.

R. Gerhards: "RFC 5424—The Syslog Protocol", Apr. 3, 2009.
Anonymous: "Installation (computer programs)—Wikipedia, the free encyclopedia", Aug. 27, 2011.
Anonymous: "Circular buffer—Wikipedia, the free encyclopedia", Aug. 18, 2011.

* cited by examiner

FIG. 4

| | COUNT VALUE | EVENT NUMBER | RELATED INFORMATION |
|---|---|---|---|
| LG1 → | 00000100 | 0001 | 00020001 |
| LG2 → | 00000500 | 0020 | 000100FF00000044 |
| LG3 → | 00000C00 | 0250 | 8045000000 |

FIG. 5

| EVENT NUMBER | EVENT | RELATED INFORMATION |
|---|---|---|
| 0001 | STATUS TRANSITION OF ARITHMETIC UNIT | STATUS BEFORE TRANSITION + STATUS AFTER TRANSITION |
| 0002 | STATUS TRANSITION OF DISPLAY UNIT | STATUS BEFORE TRANSITION + STATUS AFTER TRANSITION |
| 0020 | GENERATION OF EXTERNAL ALARM | CONTENT OF ALL BITS OF EXTERNAL ALARM |
| 0021 | GENERATION OF INTERNAL ALARM | CONTENT OF ALL BITS OF INTERNAL ALARM |
| 0250 | ERROR OF PROCESS VALUE | STATUS OF PROCESS VALUE + PROCESS VALUE |
| 0251 | ERROR OF SENSOR INPUT VALUE | STATUS OF SENSOR INPUT VALUE + SENSOR VALUE |

FIELD APPARATUS

TECHNICAL FIELD

The present invention relates to a field apparatus to be installed in a plant, a factory, or the like.

Priority is claimed on Japanese Patent Application No. 2011-191564, filed on Sep. 2, 2011, the content of which is incorporated herein by reference.

BACKGROUND ART

In the related art, a distributed control system (DCS) has been constructed to implement an advanced automatic operation in a plant, a factory, or the like. In the DCS, field apparatuses (a measurement instrument and an actuator) and a control device for controlling the field apparatuses are connected via a communication means. Although a communication system which is the base of such a DCS mostly performs wired communication, wireless communication based on a wireless communication standard such as International Society of Automation (ISA) 100.11a has also been implemented in recent years.

In the plant and the like, safety and reliability have the highest priority. Therefore, the field apparatus which constructs the DCS usually includes a self-diagnosis function of automatically diagnosing its own status. Here, self-diagnosis to be automatically performed in the field apparatus is generally classified into self-diagnosis in which it is diagnosed whether results of measurement and arithmetic operations to be periodically performed are abnormal and self-diagnosis in which it is diagnosed whether a setting value such as a parameter is abnormal. In the former diagnosis, for example, a process value error representing that a process value has exceeded a preset threshold value or a sensor error representing that a signal from a sensor is an abnormal value is diagnosed. In the latter diagnosis, for example, an adjustment error representing that an adjustment amount set by the user to adjust the field apparatus is an abnormal value is diagnosed.

The field apparatus of the related art processes an error detected by the self-diagnosis as an alarm and saves four previously generated alarms as an alarm history. Here, the field apparatus of the related art is configured to update the alarm history only when the generated alarm has been changed without updating the alarm history when the same alarm is continuously generated. In addition, when a new alarm has been generated in a status in which four alarms are already saved as an alarm history, an oldest alarm is configured to be overwritten with the newly generated alarm.

The following Patent Document 1 does not relate to the field apparatus, but discloses technology for recording an execution command history of a central processing unit (CPU). Specifically, in Patent Document 1, technology for recording a command executed by the CPU, its address, or write data as a history on a command history buffer in order to facilitate analysis when an error which disables processing continuation is generated in an information processing device including a CPU of a pipeline control scheme is disclosed.

PRIOR ART DOCUMENTS

Patent Documents

[Patent Document 1]
Japanese Unexamined Patent Application, First Publication No. H5-158754

DISCLOSURE OF INVENTION

Problems to be Solved by the Invention

Incidentally, because the above-described field apparatus is an embedded apparatus installed in a plant and the like, the current status is that an external shape or a size is first specified from a relationship subjected to restrictions in an installation space and a required function is implemented by minimum required components. Because of this, it can be said that an alarm history function is poor because the field apparatus of the related art merely saves four previous alarms as an alarm history as described above.

Although the alarm history function is poor, it is not impossible to recognize all errors occurring in the field apparatus from the saved alarm history, and the field apparatus of the related art can recognize an error to a certain extent. However, because the alarm history function of the related art is poor, it is difficult for the field apparatus of the related art to accurately recognize what error has occurred and when the error has occurred in the field apparatus.

Here, if a large-capacity memory is newly mounted as a memory which stores the alarm history, the alarm history function of the field apparatus may be enhanced. However, because an increase in cost should also be avoided in the field apparatus along with restrictions in the installation space as described above, it is difficult to increase a scale in contrast to the technology disclosed in the above-described Patent Document 1. Because of this, it is difficult to enhance the alarm history function by mounting the new large-capacity memory on the field apparatus.

The present invention provides a field apparatus capable of accurately recognizing a previously generated event without significantly increasing a scale and cost.

Means for Solving the Problems

A field apparatus in accordance with a preferred embodiment of the present invention includes: a first memory that stores a program specifying an operation of the field apparatus; a second memory that stores parameters to be used in the field apparatus; a log generation unit configured to generate an operating log in which first information representing a type of an event generated within the field apparatus, second information representing a time at which the event was generated, and third information related to the event are associated; and a control unit that includes the log generation unit, the control unit storing the operating log in a log storage region secured in a free space in one of the first memory and the second memory.

The third information may be any one of information representing statuses of the field apparatus before and after a point in time at which the event was generated, information representing a status of the field apparatus at the point in time at which the event was generated, and information to be used in a predetermined process to be performed by the field apparatus at the point in time at which the event was generated.

The log generation unit may be configured to generate the operating log every time the event is generated within the field apparatus, and the control unit may be configured to store the operating log in the log storage region in time series every time the log generation unit generates the operating log.

The field apparatus may further include: a log analysis unit that is included in the control unit, the log analysis unit performing a predetermined analysis process by using the operating log stored in the log storage region; and an output unit configured to output a result of the analysis process performed by the log analysis unit.

The log storage region may be secured in the free space of the second memory, and the control unit may further include an update control unit configured to temporarily store an update program for updating a program, which has been stored in the first memory, in the log storage region, which has been secured in the second memory, the control unit updating the program, which has been stored in the first memory, by using the update program.

The update control unit may be configured to temporarily store the update program in the log storage region, which has been secured in the second memory, by overwriting the operating log, which has been stored in the log storage region that has been secured in the second memory, using the update program.

Each function of the control unit may be implemented by the control unit reading and executing the program stored in the first memory.

The first memory may be a non-volatile semiconductor memory, and the program stored in the first memory may be updated to an update program distributed from a host device via a wireless communication network according to control of the control unit.

The second memory may use ferroelectric hysteresis and be a ferroelectric random access memory (FeRAM) that is a non-volatile semiconductor memory using ferroelectric hysteresis to associate positive and negative spontaneous polarizations with values "1" and "0," and the second memory may store the operating log of the field apparatus generated by the control unit or an update program distributed from a host device via a wireless communication network.

First and second regions may be secured by the control unit in the second memory, the first region may be a parameter storage region secured to store the parameters, and the second region may be the log storage region secured in the free space of the second memory to store the operating log or an update program.

The free space of the second memory may be pre-secured as the log storage region that stores the operating log, and an update program may be stored in the log storage region when the program stored in the first memory is updated.

The event may include a status transition of the field apparatus, generation of an external or internal alarm due to an external or internal error of the field apparatus, an error of a process value or a measurement value, and an error of a user-set installation value.

Information representing a leading address at which the operating log is newly stored in the log storage region may be stored in the parameter storage region, and when there is no remaining capacity of the log storage region, the log generation unit may overwrite a previously stored operating log with a new operating log by returning to a head of the log storage region.

The first information may be a number uniquely allocated to each event generated within the field apparatus, the second information may be a count value of a 32-bit counter to be used by the control unit, reference time information representing a time at which a count operation by the counter was started may be stored in the parameter storage region, and the third information may be information related to the event generated within the field apparatus and information in which content and a data length differ according to each event.

A method of operating a field apparatus in accordance with a preferred embodiment of the present invention includes: storing a program specifying an operation of the field apparatus in a first memory of a field apparatus; storing parameters to be used in the field apparatus in a second memory of the field apparatus; generating an operating log in which first information representing a type of an event generated within the field apparatus, second information representing a time at which the event was generated, and third information related to the event are associated; and storing the operating log in a log storage region secured in a free space in either of the first and second memories.

Effects of the Invention

According to an embodiment of the present invention, a log generation unit generates an operating log in which first information representing a type of an event generated within the apparatus, second information representing a time at which the event was generated, and third information related to the event are associated, and stores the operating log in a log storage region secured in a free space in either of the first and second memories. Therefore, a previously generated event can be accurately recognized without significantly increasing a scale and cost.

BRIEF DESCRIPTION OF THE DRAWINGS

FIG. 4 is a diagram illustrating an example of an operating log generated by the field apparatus in accordance with the embodiment of the present invention.

FIG. 5 is a diagram illustrating a specific example of related information included in the operating log in the embodiment of the present invention.

EMBODIMENTS FOR CARRYING OUT THE INVENTION

Figure 1:
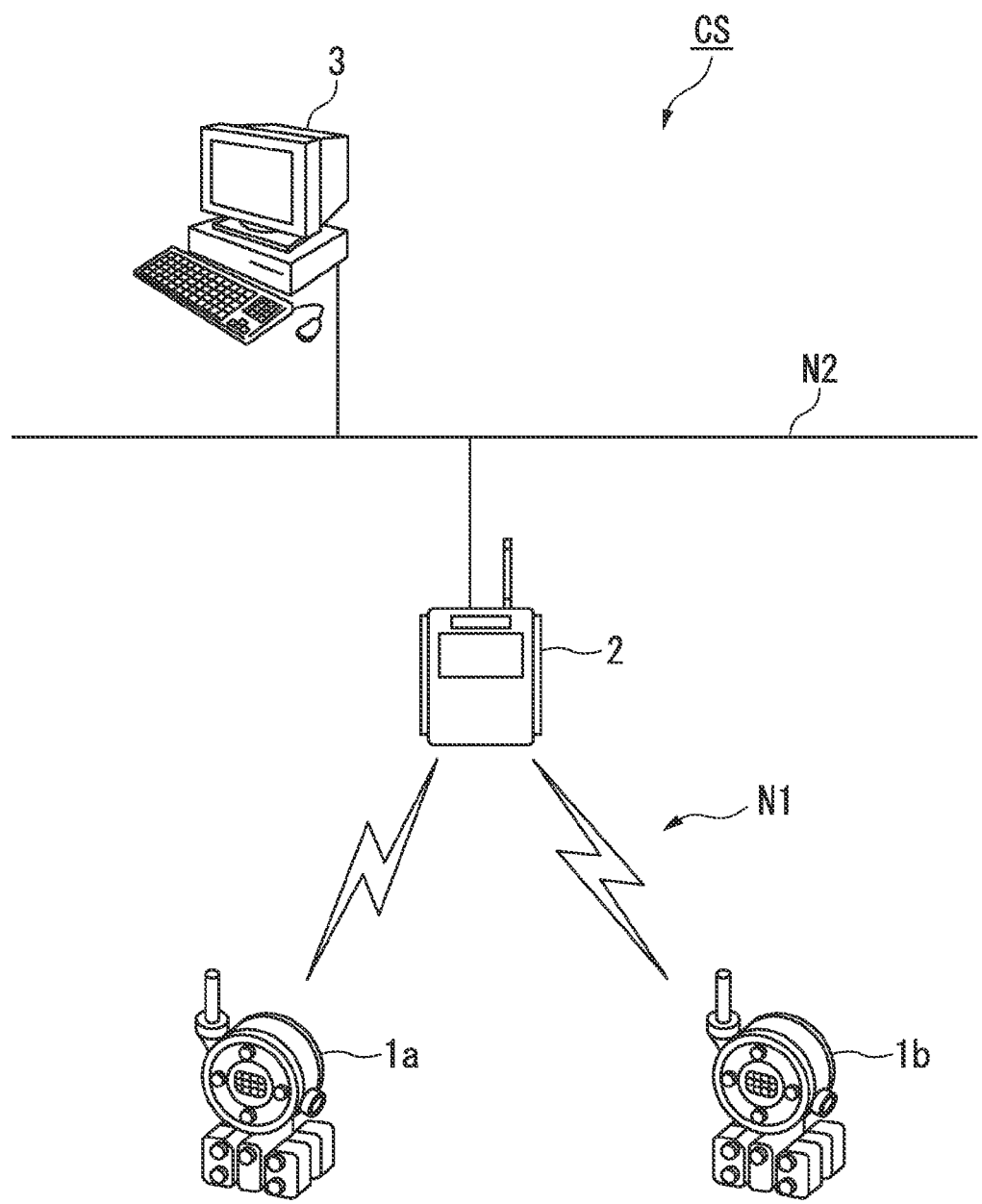
FIG. 1 is a block diagram illustrating an overall configuration of a wireless communication system in which a field apparatus in accordance with an embodiment of the present invention is used.

Hereinafter, a field apparatus in accordance with an embodiment of the present invention will be described in detail with reference to the drawings. FIG. 1 is a block diagram illustrating an overall configuration of a wireless communication system in which the field apparatus in accordance with the embodiment of the present invention is used. As illustrated in FIG. 1, the wireless communication system CS includes wireless field apparatuses 1a and 1b, a wireless gateway 2, and a host device 3. Communication via a wireless communication network N1 and a backbone network N2 is possible. Although the two wireless field apparatuses 1a and 1b are illustrated in FIG. 1, the number of wireless field apparatuses is arbitrary.

The wireless field apparatuses 1a and 1b, for example, are sensor apparatuses such as flowmeters or temperature sensors, valve apparatuses such as flow control valves or opening/closing valves, actuator apparatuses such as fans or motors, and apparatuses installed in a plant or a factory, and perform wireless communication based on ISA 100.11a which is a wireless communication standard for industrial automation. Each of the wireless field apparatuses 1a and 1b includes a self-diagnosis function of automatically diagnosing its own status in order to improve safety and reliability. Details of internal configurations of the wireless field apparatuses 1a and 1b will be described later.

The wireless gateway 2 connects the wireless communication network N1 to which the wireless field apparatuses 1a and 1b are connected to the backbone network N2 to which the host device 3 is connected, and relays various data to be transmitted and received between the wireless field apparatuses 1a and 1b and the host device 3. This wireless gateway 2 can perform wireless communication based on the above-described wireless communication standard ISA 100.11a, and performs control of wireless communication to be performed via the wireless communication network N1, a join process of whether to cause the wireless field apparatus to join the wireless communication network N1, etc.

The host device 3 is connected to the backbone network N2 which is a wired network, and, for example, is a device to be operated by a manager of the wireless communication system CS. According to an operation of the manager, the host device 3, for example, performs communication with the wireless gateway 2 to acquire information (measurement data, information (alarm) representing an error, etc.) about the wireless field apparatuses 1a and 1b and uses the acquired information for management of the wireless field apparatuses 1a and 1b. In addition, the host device 3 distributes a program (update program) for updating a program used by the wireless field apparatuses 1a and 1b to the wireless field apparatuses 1a and 1b via the wireless gateway 2.

Figure 2:
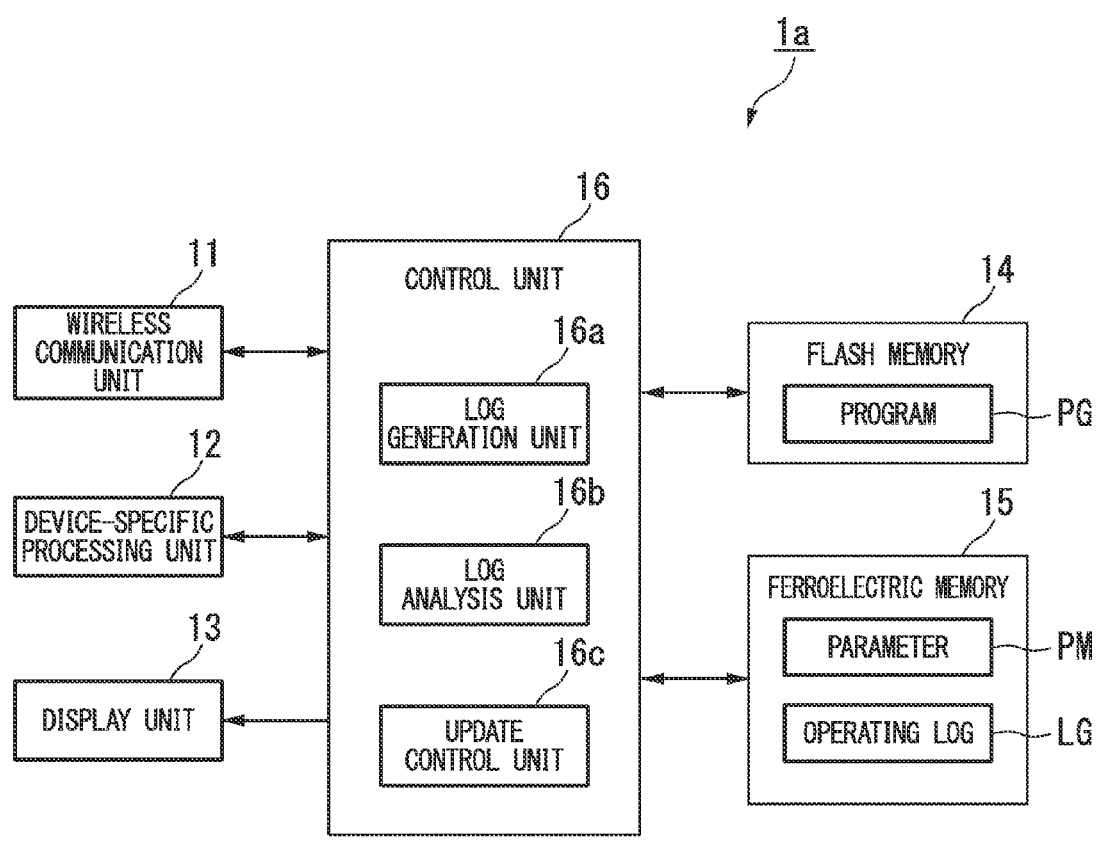
FIG. 2 is a block diagram illustrating a main configuration of the field apparatus in accordance with the embodiment of the present invention.

Next, the internal configurations of the wireless field apparatuses 1a and 1b will be described in detail. FIG. 2 is a block diagram illustrating a main configuration of the field apparatus in accordance with the embodiment of the present invention. Because the wireless field apparatuses 1a and 1b have the same configuration, only the wireless field apparatus 1a will be described and description of the wireless field apparatus 1b is omitted hereinafter. In addition, only a main configuration necessary for description of the present invention among configurations provided in the wireless field apparatus 1a is illustrated in FIG. 2.

As illustrated in FIG. 2, the wireless field apparatus 1a includes a wireless communication unit 11 (output unit), an apparatus-specific processing unit 12, a display unit 13 (output unit), a flash memory 14 (first memory), a ferroelectric memory 15 (second memory), and a control unit 16, and performs a predetermined process while monitoring a status of the apparatus according to a program PG stored in the flash memory 14. Here, a predetermined process to be performed by the wireless field apparatus 1a, for example, is a temperature measurement process, a valve opening/closing process, an actuator operation process, or the like. In this embodiment, the temperature measurement process is assumed to be performed as the above-described predetermined process.

Under control of the control unit 16, the wireless communication unit 11 performs wireless communication with the wireless gateway 2 via the wireless communication network N1. The wireless communication to be performed by the wireless communication unit 11 is based on the above-described wireless communication standard ISA 100.11a. The apparatus-specific processing unit 12 performs a process specific to the wireless field apparatus 1a under control of the control unit 16. Specifically, in this embodiment, the apparatus-specific processing unit 12 includes a temperature sensor, and performs the temperature measurement process as the above-described specific process. The display unit 13 includes a display device such as a liquid crystal display device, and, for example, displays various messages and apparatus statuses for an operator who performs maintenance work of the wireless field apparatus 1a under control of the control unit 16.

The flash memory 14 is a non-volatile semiconductor memory, and stores the program PG which specifies an operation of the wireless field apparatus 1a. The program PG can be updated to an update program distributed from the host device 3 via the wireless communication network N1 or the like according to control of the control unit 16. A capacity of the flash memory 14 provided in the wireless field apparatus 1a, for example, is about 256 kilobytes.

The ferroelectric memory 15 uses ferroelectric hysteresis and is also referred to as a ferroelectric random access memory (FeRAM) which is a non-volatile semiconductor memory using ferroelectric hysteresis to associate positive and negative spontaneous polarizations with values "1" and "0." The ferroelectric memory 15 stores various parameters PM to be used by the wireless field apparatus 1a, and stores an operating log LG of the apparatus generated by the control unit 16 or the update program distributed from the host device 3 via the wireless communication network N1. A capacity of the ferroelectric memory 15 provided in the wireless field apparatus 1a, for example, is also about 256 kilobytes.

Figure 3:
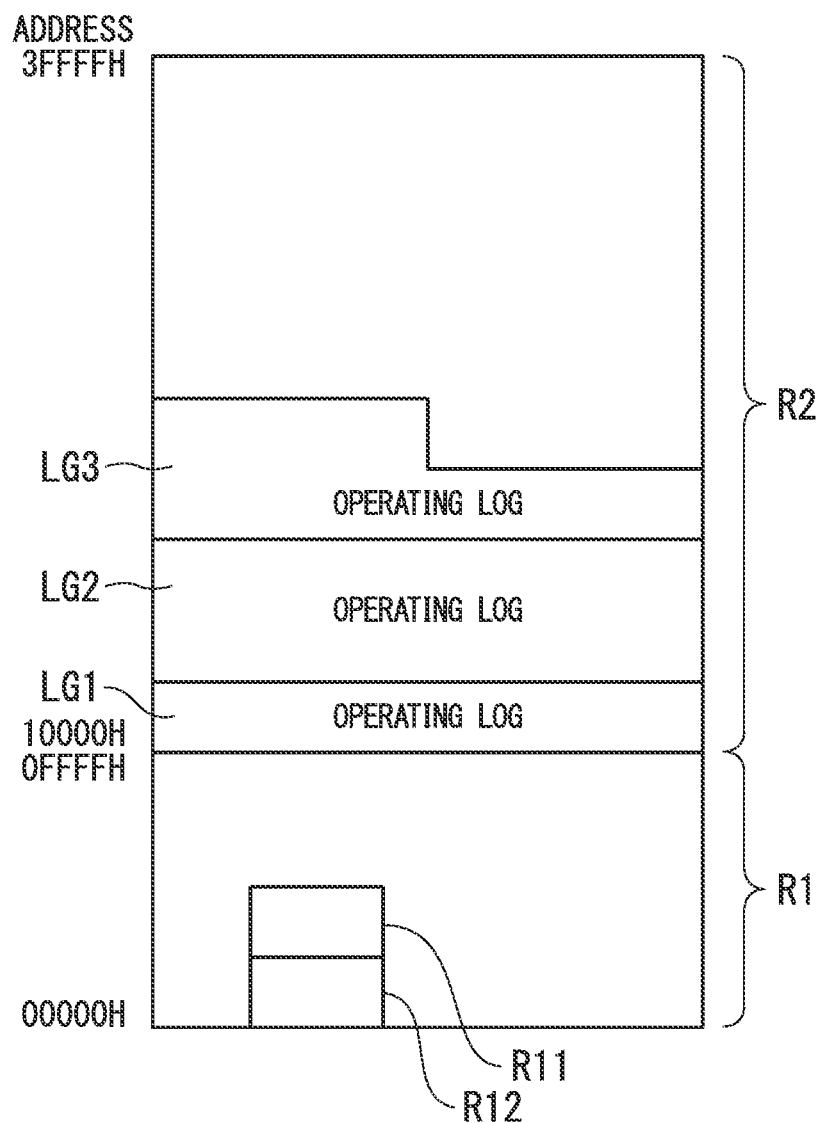
FIG. 3 is a diagram illustrating a memory map of a ferroelectric memory provided in the field apparatus in accordance with the embodiment of the present invention.

Here, in the ferroelectric memory 15, two regions R1 and R2 illustrated in FIG. 3 are secured by the control unit 16. FIG. 3 is a diagram illustrating a memory map of the ferroelectric memory provided in the field apparatus in accordance with the embodiment of the present invention. The region R1 illustrated in FIG. 3 is a parameter storage region secured to store the above-described parameters PM, and, for example, is a region whose capacity is 64 kilobytes. On the other hand, the region R2 illustrated in FIG. 3 is a log storage region secured in a free space (a region other than the parameter storage region R1) of the ferroelectric memory 15 to store the above-described operating log LG or the above-described update program, and, for example, is a region whose capacity is 192 kilobytes.

When the program PG stored in the flash memory 14 is updated, the free space of the ferroelectric memory 15 is only used to temporarily store the update program distributed from the host device 3 via the wireless communication network N1. In this embodiment, the free space of the ferroelectric memory 15 is pre-secured as the log storage region R2 which stores the operating log LG and the update program is configured to be stored in the log storage region R2 when the program PG stored in the flash memory 14 is updated. This is intended to prevent a significant increase in a scale and cost by effectively utilizing the free space of the ferroelectric memory 15 to store the operating log LG.

The control unit 16 includes a log generation unit 16a, a log analysis unit 16b, and an update control unit 16c, and generally controls an operation of the wireless field apparatus 1a. Respective functions of the log generation unit 16a, the log analysis unit 16b, and the update control unit 16c provided in the control unit 16 are implemented by the control unit 16 reading and executing the program stored in the flash memory 14.

The log generation unit 16a generates the operating log LG when a predetermined event has been generated in the wireless field apparatus 1a. The generated operating log LG is stored in the log storage region R2 secured in the ferroelectric memory 15 according to control of the control unit 16. Here, an event in which it is necessary for the log generation unit 16a to generate the operating log LG includes a status transition of the apparatus, generation of an external or internal alarm due to an external or internal error of the apparatus, an error of a process value or a measurement value, an error of a user-set installation value, etc.

The log generation unit 16*a* generates the operating log LG every time the above-described event is generated. For example, like the operating logs LG1, LG2, and LG3 illustrated in FIG. 3, the generated operating log LG is stored in time series in the log storage region R2 secured in the ferroelectric memory 15 according to control of the control unit 16. Information representing a leading address at which an operating log should be newly stored in the log storage region R2 is stored in the region R11 within the parameter storage region R1 illustrated in FIG. 3. Because of this, if the control unit 16 sequentially stores the operating logs LG1, LG2, and LG3 in the log storage region R2 while referring to an address stored in the region R11, the operating logs LG1, LG2, and LG3 are configured to be stored in time series. When there is no remaining capacity of the log storage region R2, the control unit 16 overwrites an already stored operating log with a new operating log by returning to the head of the log storage region R2.

FIG. 4 is a diagram illustrating an example of an operating log generated by the field apparatus in accordance with the embodiment of the present invention. As illustrated in FIG. 4, the operating log LG generated in this embodiment includes a count value (second information), an event number (first information), and related information (third information). The count value is information representing a generation time of an event generated within the wireless field apparatus 1*a*. The event number is information representing a type of the event. The related information is information related to the generated event.

The count value, for example, is a count value of a 32-bit counter (for example, a counter which increments the count value every second) to be used in the control unit 16. Reference time information representing a time at which a count operation was started by the counter is stored in the region R12 within the parameter storage region R1 illustrated in FIG. 3. Because of this, if the time represented by the count value is added to the time represented by the reference particular information stored in the region R12, it is possible to obtain a time at which the event was generated. The count value is used instead of the time itself to reduce a data amount.

The event number is a number uniquely allocated to each event generated within the wireless field apparatus 1*a*. Because of this, it is possible to identify the event generated within the wireless field apparatus 1*a* from the event number. The related information is information related to the event generated within the wireless field apparatus 1*a* and information in which content and a data length differ according to each event. Specifically, the related information is information representing statuses of the apparatus before and after a point in time at which the event was generated, information representing a status of the apparatus at the point in time at which the event was generated, information to be used in a predetermined process to be performed by the apparatus-specific processing unit 12 and the like at the point in time at which the event was generated, etc.

FIG. 5 is a diagram illustrating a specific example of related information included in the operating log in the embodiment of the present invention. In the example illustrated in FIG. 5, related information about events to which event numbers "0001," "0002," "0020," "0021," "0250," and "0251" have been allocated is illustrated. Here, the events to which the event numbers "0001" and "0002" have been allocated are a status transition of an arithmetic unit (not illustrated) and a status transition of the display unit 13, respectively, and the related information of these events is information representing a status before the transition and a status after the transition, that is, information representing statuses of the apparatus before and after the event was generated.

In addition, the events to which the event numbers "0020" and "0021" have been allocated are generations of external and internal alarms, respectively, and the related information of these events is information representing content of all bits of the generated external and internal alarms, that is, information representing the statuses of the apparatus at points in time at which the events were generated. In addition, the events to which the event numbers "0250" and "0251" have been allocated are errors of a process value and a sensor input value, respectively, and the related information of these events is information representing statuses of these values and these values themselves, that is, information to be used by the apparatus-specific processing unit 12 and the like at points in time at which the events were generated.

Specifically, because the count value is "00000100" and the event number is "0001" in an operating log LG1 illustrated in FIG. 4, it can be seen that the event was generated according to a status transition of the arithmetic unit occurring 256 seconds after the count operation was started by the counter of the control unit 16. In addition, because the related information is "00020001," it can be seen that the status of the arithmetic unit before the transition is "0002" and the status of the arithmetic unit after the transition is "0001."

In addition, because the count value is "00000500" and the event number is "0020" in an operating log LG2 illustrated in FIG. 4, it can be seen that the event was generated according to the external alarm generated 1280 seconds after the count operation was started by the counter of the control unit 16. In addition, it can be seen that content of all bits of the external alarm is "000100FF00000044" from the related information.

Further, because the count value is "00000C00" and the event number is "0250" in an operating log LG3 illustrated in FIG. 4, it can be seen that the event was generated according to an error of the process value generated 3072 seconds after the count operation was started by the counter of the control unit 16. In addition, the status of the process value and the process value are found from the related information "8045000000."

The log analysis unit 16*b* performs lifetime diagnosis or preventive maintenance by reading and self-diagnosing the operating log LG stored in the ferroelectric memory 15 in a given cycle. For example, a replacement time of a battery provided in the wireless field apparatus 1*a* is predicted by analyzing the fluctuation of a power supply voltage or noise, or a life (replacement time) of the temperature sensor is predicted by analyzing a measurement value of the temperature sensor. Preventive maintenance is enabled by transmitting an analysis result of the log analysis unit 16*b* from the wireless communication unit 11 to the host device 3 or displaying the analysis result on the display unit 13 to provide a notification of the analysis result to a manager or a worker.

When the update program has been distributed from the host device 3 via the wireless communication network N1 or the like, the update control unit 16*c* performs control to update the program PG stored in the flash memory 14. Specifically, the update program distributed by the host device 3 is temporarily stored in the log storage region R2 of the ferroelectric memory 15 and the program PG stored in the flash memory 14 is rewritten (updated) to the update program temporarily stored in the log storage region R2 of the ferroelectric memory 15.

Here, when the update program distributed by the host device 3 is stored in the log storage region R2 of the ferroelectric memory 15, the update control unit 16c overwrites the operating log LG stored in the log storage region R2 using the update program. When the program PG stored in the flash memory 14 is updated, the operating log LG generated by the log generation unit 16a implemented by executing the program PG, that is, the operating log LG stored in the log storage region R2 of the ferroelectric memory 15, is meaningless and should be deleted.

In this embodiment, when the program PG stored in the flash memory 14 is updated, the update control unit 16c overwrites the operating log LG stored in the log storage region R2 of the ferroelectric memory 15 using the update program. This is intended to save the time and labor of deleting the meaningless operating log LG and prevent a situation in which erroneous use is done without deleting the meaningless operating log LG.

Figure 6:
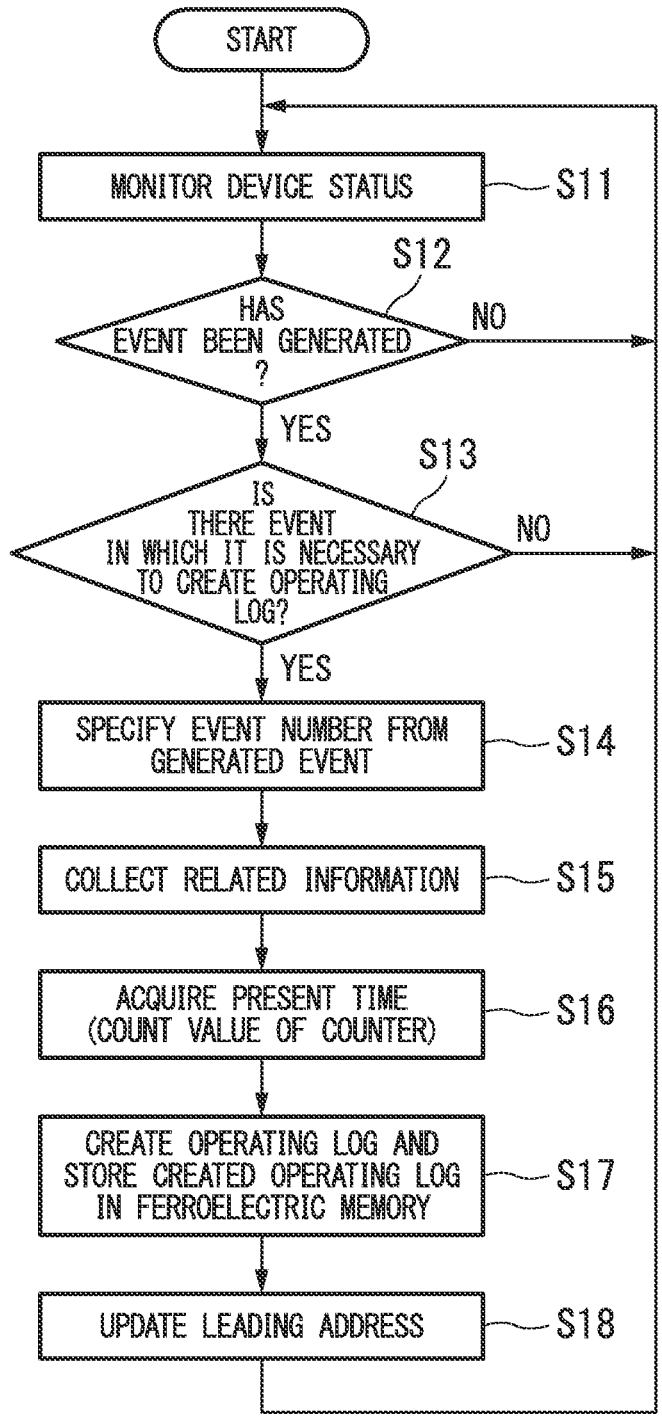
FIG. 6 is a flowchart illustrating an operation of the field apparatus in accordance with the embodiment of the present invention.

Next, an operation of the wireless field apparatus 1a in the above-described configuration will be described. FIG. 6 is a flowchart illustrating an operation of the field apparatus in accordance with the embodiment of the present invention. The flowchart illustrated in FIG. 6 is a flowchart representing an operation related to generation of an operating log among various operations to be performed in the wireless field apparatus 1a, and is started after the wireless field apparatus 1a has been powered on.

If the process illustrated in FIG. 6 is started, a status of the wireless field apparatus 1a is first monitored according to the program PG stored in the flash memory 14 in step S11, and the control unit 16 determines whether an event has been generated within the wireless field apparatus 1a in step S12. When it is determined that no event has been generated within the wireless field apparatus 1a (when the determination result of step S12 indicates "No"), status monitoring of the wireless field apparatus 1a continues by returning to step S11.

On the other hand, when it is determined that the event has been generated within the wireless field apparatus 1a (when the determination result of step S12 indicates "Yes"), the control unit 16 determines whether the generated event is an event in which it is necessary to generate the operating log LG in step S13. Specifically, it is determined which of a status transition of the wireless field apparatus 1a, generation of an external or internal alarm due to an external or internal error of the wireless field apparatus 1a, an error of a process value or a measurement value, and an error of a user-set installation value is the generated event.

When the control unit 16 determines that the generated event is not an event in which it is necessary to generate the operating log LG (when the determination result of step S13 indicates "No"), the status monitoring of the wireless field apparatus 1a continues by returning to step S11. On the other hand, when the control unit 16 determines that the generated event is an event in which it is necessary to generate the operating log LG (when the determination result of step S13 indicates "Yes"), the log generation unit 16a performs a process of creating the operating log LG.

Specifically, first, in step S14, an event number is first identified from the generated event. Then, in step S15, the control unit 16 performs a process of collecting related information related to the event. Next, in step S16, the control unit 16 performs a process of acquiring a present time (a count value of the counter of the control unit 16). Then, in step S17, the operating log LG in which the count value acquired in the process of step S16, the event number identified in the process of step S14, and the related information collected in the process of step S15 are associated is stored in the log storage region R2 of the ferroelectric memory 15 generated by the log generation unit 16a.

Ultimately, in step S18, the control unit 16 performs a process of updating the leading address stored in the region R11 (see FIG. 3) of the ferroelectric memory 15 according to a length of the operating log LG stored in step S17. When the process of step S18 ends, the process returns to step S11. The above-described process is iterated, and the operating log LG is sequentially stored in time series in the log storage region R2 of the ferroelectric memory 15 every time an event in which it is necessary to generate the operating log LG is generated within the wireless field apparatus 1a.

The operating log LG stored in the log storage region R2 of the ferroelectric memory 15 is read by the log analysis unit 16b provided in the control unit 16 in a given cycle, and analyzed for lifetime analysis and the like. The analysis result of the log analysis unit 16b is transmitted from the wireless communication unit 11 to the host device 3 or displayed on the display unit 13, so that a notification of the analysis result is provided to the manager of the wireless communication system CS or the worker who performs a maintenance operation of the wireless field apparatus 1a.

As shown above, when the status of the wireless field apparatus 1a is monitored and an event in which it is necessary to generate the operating log LG has been generated within the wireless field apparatus 1a in this embodiment, the operating log LG in which the count value (information representing a generation time of the event generated within the wireless field apparatus 1a), the event number (information representing a type of the generated event), and the related information (information related to the generated event) are associated is configured to be stored in the log storage region R2 of the ferroelectric memory 15. Because of this, compared to when only an alarm is saved as an alarm history as in the related art, it is possible to recognize information related to a time at which an event was generated or information related to the event and accurately recognize a previously generated event.

In addition, because the operating log LG is sequentially stored in time series in the log storage region R2 of the ferroelectric memory 15 in this embodiment, the transition of the event generated by the wireless field apparatus 1a can be traced, thereby accurately recognizing a previously generated event. In addition, because a region other than the parameter storage region R1 of the ferroelectric memory 15 is secured as the log storage region R2 and a region for use in storage of an update program (an update program for updating the program PG stored in the flash memory 14) is also used to store the operating log LG in this embodiment, no significant increase in a scale and cost is caused.

Further, in this embodiment, analysis for lifetime diagnosis and the like is performed by reading the operating log LG from the log storage region R2 of the ferroelectric memory 15 in a given cycle, and the analysis result is transmitted to the host device 3 or displayed on the display unit 13. Thereby, preventive maintenance is possible because it is possible to know a replacement time of the battery provided in the wireless field apparatus 1a or the life (replacement time) of the temperature sensor in advance.

Although the field apparatus according to the embodiment of the present invention has been described above, the present invention is not limited to the above-described embodiment, and changes can be freely made in the scope of the present invention. For example, although an example in which the operating log LG is stored by securing the log storage region R2 in the ferroelectric memory 15 has been described in the above-described embodiment, the operating log LG may be stored by securing the same region as the log storage region R2 in the flash memory 14. In addition, although an example in which the ferroelectric memory 15 is used as a memory in which the parameters PM and the operating log LG are stored has been described in the above-described embodiment, an emulated electrically erasable programmable read only memory (EEEPROM) or a flash memory may be used instead of the ferroelectric memory 15.

In addition, an example in which the wireless field apparatuses 1a and 1b analyze the operating log LG and transmit the analysis result to the host device 3 has been described in the above-described embodiment. However, the host device 3 may acquire and analyze the operating log LG stored in the wireless field apparatuses 1a and 1b. Further, although an example of the wireless field apparatuses 1a and 1b capable of wireless communication based on the wireless communication standard ISA 100.11a has been described in the above-described embodiment, the present invention can also be applied to the field apparatus which performs communication via a wired network.

INDUSTRIAL APPLICABILITY

The present invention can be widely applied to a field apparatus installed in a plant, a factory, or the like, and can implement a field apparatus capable of accurately recognizing a previously generated event without significantly increasing a scale and cost.

DESCRIPTION OF THE REFERENCE SYMBOLS 1a, 1b Wireless field apparatus
2 Wireless gateways
3 Host device
11 Wireless communication unit (output unit)
12 Apparatus-specific processing unit
13 Display unit (output unit)
14 Flash memory (first memory)
15 Ferroelectric memory (second memory)
16 Control unit
16a Log generation unit
16b Log analysis unit
16c Update control unit
CS Wireless communication system
LG, LG1, LG2, LG3 Operating log
N1 Wireless communication network
N2 Backbone network
PG Program
PM Parameter
R1 Parameter storage region
R11, R12 Region within parameter storage region R1
R2 Log storage region

What is claimed is:

1. A field apparatus comprising:
a first memory that stores a program specifying an operation of the field apparatus;
a second memory that stores parameters to be used in the field apparatus;
a log generation unit configured to generate an operating log in which first information representing a type of an event generated within the field apparatus, second information representing a time at which the event was generated, and third information related to the event are associated; and
a control unit that includes the log generation unit, the control unit storing the operating log in a log storage region secured in a free space in one of the first memory and the second memory, wherein
the log storage region is secured in the free space of the second memory, and
the control unit further includes an update control unit configured to temporarily store an update program for updating a program, which has been stored in the first memory, in the log storage region, which has been secured in the second memory, the control unit updating the program, which has been stored in the first memory, by using the update program.

2. The field apparatus according to claim 1, wherein the third information is any one of information representing statuses of the field apparatus before and after a point in time at which the event was generated, information representing a status of the field apparatus at the point in time at which the event was generated, and information to be used in a predetermined process to be performed by the field apparatus at the point in time at which the event was generated.

3. The field apparatus according to claim 1, wherein
the log generation unit is configured to generate the operating log every time the event is generated within the field apparatus, and
the control unit is configured to store the operating log in the log storage region in time series every time the log generation unit generates the operating log.

4. The field apparatus according to claim 1, further comprising:
a log analysis unit that is included in the control unit, the log analysis unit performing a predetermined analysis process by using the operating log stored in the log storage region; and
an output unit configured to output a result of the analysis process performed by the log analysis unit.

5. The field apparatus according to claim 1, wherein the update control unit is configured to temporarily store the update program in the log storage region, which has been secured in the second memory, by overwriting the operating log, which has been stored in the log storage region that has been secured in the second memory, using the update program.

6. The field apparatus according to claim 1, wherein each function of the control unit is implemented by the control unit reading and executing the program stored in the first memory.

7. The field apparatus according to claim 1, wherein
the first memory is a non-volatile semiconductor memory, and
the program stored in the first memory is updated to an update program distributed from a host device via a wireless communication network according to control of the control unit.

8. The field apparatus according to claim 1, wherein
the second memory uses ferroelectric hysteresis and is a ferroelectric random access memory (FeRAM) that is a non-volatile semiconductor memory using ferroelectric hysteresis to associate positive and negative spontaneous polarizations with values "1" and "0," and
the second memory stores the operating log of the field apparatus generated by the control unit or an update program distributed from a host device via a wireless communication network.

9. A field apparatus comprising:
a first memory that stores a program specifying an operation of the field apparatus;
a second memory that stores parameters to be used in the field apparatus;
a log generation unit configured to generate an operating log in which first information representing a type of an event generated within the field apparatus, second information representing a time at which the event was generated, and third information related to the event are associated; and a control unit that includes the log generation unit, the control unit storing the operating log in a log storage region secured in a free space in one of the first memory and the second memory, wherein the free space of the second memory is pre-secured as the log storage region that stores the operating log, and an update program is stored in the log storage region when the program stored in the first memory is updated.

10. The field apparatus according to claim 9, wherein the event includes a status transition of the field apparatus, generation of an external or internal alarm due to an external or internal error of the field apparatus, an error of a process value or a measurement value, and an error of a user-set installation value.

11. The field apparatus according to claim 9, wherein information representing a leading address at which the operating log is newly stored in the log storage region is stored in the parameter storage region, and when there is no remaining capacity of the log storage region, the log generation unit overwrites a previously stored operating log with a new operating log by returning to a head of the log storage region.

12. A field apparatus comprising:

a first memory that stores a program specifying an operation of the field apparatus;

a second memory that stores parameters to be used in the field apparatus;

a log generation unit configured to generate an operating log in which first information representing a type of an event generated within the field apparatus, second information representing a time at which the event was generated, and third information related to the event are associated; and a control unit that includes the log generation unit, the control unit storing the operating log in a log storage region secured in a free space in one of the first memory and the second memory, wherein first and second regions are secured by the control unit in the second memory, the first region is a parameter storage region secured to store the parameters, the second region is the log storage region secured in the free space of the second memory to store the operating log or an update program, the first information is a number uniquely allocated to each event generated within the field apparatus, the second information is a count value of a 32-bit counter to be used by the control unit, reference time information representing a time at which a count operation by the counter was started is stored in the parameter storage region, and the third information is information related to the event generated within the field apparatus and information in which content and a data length differ according to each event.

* * * * *